United States Patent [19]

Yates et al.

[11] 3,862,993

[45] Jan. 28, 1975

[54] PROCESS FOR CONDENSATION OF ALCOHOLS

[75] Inventors: James E. Yates; Kaye L. Motz, both of Ponca City, Okla.

[73] Assignee: Continental Oil Company, Ponca City, Okla.

[22] Filed: June 6, 1973

[21] Appl. No.: 367,688

[52] U.S. Cl............ 260/642 C, 252/431, 260/438.1, 260/632 A, 260/642 R, 260/643 B, 260/643 D, 260/643 G, 260/681, 260/683.9
[51] Int. Cl............................................. C07c 31/02
[58] Field of Search......................... 260/642, 642 C

[56] References Cited
UNITED STATES PATENTS
2,762,847   9/1956   Miller et al. ........................ 260/642
3,642,914   2/1972   Mitchell.............................. 260/642

Primary Examiner—Joseph E. Evans
Attorney, Agent, or Firm—Ronald J. Carlson

[57] ABSTRACT

A process for producing higher molecular weight alcohols by condensing at least one lower molecular weight primary alkanol having a methylene group adjacent the hydroxylated carbon atom at elevated temperatures in the presence of an alkali catalyst and a copper salt of a $\beta$-diketone while simultaneously removing water as it forms.

10 Claims, No Drawings

PROCESS FOR CONDENSATION OF ALCOHOLS

This invention relates to the condensation of alcohols to form alcohol products of higher molecular weight. More particularly, the invention relates to an improvement in the condensation of primary and/or secondary alcohols having a methylene group adjacent the hydroxylated carbon atom to produce alcohols having a carbon content equal to the sum of the carbon atoms of the tow reactant alcohols and which are branched at the beta carbon atom.

According to the well-known Guerbet reaction, a primary or secondary alcohol which contains a methylene group adjacent the hydroxylated carbon atom may be condensed with itself or with another alcohol of the same class to form a higher alcohol containing the sum of the carbon atoms of the reactant alcohols as the principal product. The classic catalyst for the Guerbet reaction is a strong alkali such as sodium metal, which is generally in the form of its alcoholate during reaction, sodium and potassium hydroxides and the like. Many theories have been advanced as to the particular mechanism of the reaction (for example, see U.S. Pat. Nos. 2,004,350; 2,971,033; 2,829,177 and 3,558,716) and, as indicated in U.S. Pat. No. 2,762,847, there is little general agreement as to what reaction or reactions actually occur during transformation of the lower alcohols to the higher alcohols. It is further indicated that a plurality of different reactions are likely involved so that the process is highly sensitive and unpredictable as to the effect of particular catalysts.

The overall reaction, of course, produces a reaction product mixture which not only contains the higher alcohols but also corresponding higher aldehydes and higher unsaturated alcohols and aldehydes as well as various other by-products due to side reactions. The higher aldehydes and higher unsaturated alcohols and aldehydes present little difficulty since upon hydrogenation of the reaction product they are converted to the desired higher alcohols. The other by-products which have been mentioned in the art include carboxylic acids as well as salts and esters thereof, and ordinarily it is desirable to minimize their formation. One technique for reducing by-products, which is suggested in U.S. Pat. No. 3,328,748, involves the use of less than 3 mol percent alkali catalyst and temperatures in the range of 200°–300°C while continuously removing water formed by the reaction. On the other hand, it is known that in achieving acceptable reaction rates relatively high temperatures (e.g., 290°C) and relatively large quantities of alkali catalyst must be employed, but under these conditions considerable unwanted by-products are also obtained. Thus, it was necessary to balance the reaction rate against the tolerable by-products in the standard Guerbet reaction.

Considerable activity has been involved in developing various approaches to attempt to improve the reaction rate of this process and, at the same time, reduce or at least not increase the by-products. Among the various approaches attempted are the use of certain phosphates as cocatalysts (U.S. Pat. No. 2,762,847); the use of a particular combination catalyst mixture made up of potassium carbonate, magnesium oxide and copper chromite (U.S. Pat. No. 2,971,033); the use of various dehydrogenation catalysts including copper chromite, oxide, sulfate, nitrate and carboxylates (see French Pat. No. 784,656; German Pat. No. 734,468; U.S. Pat. Nos. 2,457,866; 2,757,139; 2,836,628; German Pat. Nos. 748,040; 911,730; 855,108; 855,107 and U.S. Pat. No. 2,829,177); and the use of platinum series metals (U.S. Pat. Nos. 3,514,493 and 3,479,412).

In accordance with this invention, it has unexpectedly been found that a significantly improved reaction rate may be obtained or, alternatively, significantly milder reaction conditions may be employed in the condensation of primary or secondary alkanols having methylene groups adjacent the hydroxylated carbon atoms by carrying out the condensation reaction in the presence of an alkali metal catalyst and a copper salt of $\beta$-diketone as the sole required co-catalyst.

The selectivity of the overall process of the invention may also be maintained, as indicated by the hydrogenated product, compared with the standard Guerbet reaction, at least with smaller amounts of the copper salts. Large amounts of copper salts will generally lead to somewhat reduced selectivity but greater differences in by-product distribution as described hereinafter. By selectivity, it is meant selectivity to the desired higher alcohols and precursors therefor such as higher aldehydes and higher unsaturated alcohols convertible to the desired higher alcohols by hydrogenation. While the remaining by-products remain substantially the same quantitatively, their distribution is altered somewhat, namely, there is a reduction in the amount of dienes produced and an increase in higher boiling compounds. This feature is particularly advantageous when condensing alcohols of mixed carbon content since any dienes produced result in corresponding paraffins upon hydrogenation, some of which are not readily separable by simple distillation due to similarity of boiling points with the product higher alcohols. Thus, with reduced diene content there is a reduction in the paraffins which are not readily separable in such a situation.

In describing the invention in detail, the alkanols which may be used are primary or secondary alkanols having methylene groups adjacent the hydroxylated carbon atoms. These alkanols may best be illustrated by the formula

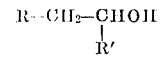

wherein each of R and R' can be hydrogen or a straight or branch chain alkyl group. While there is no limitation as to the number of carbon atoms the alkyl group may contain from a theoretical standpoint, more practical considerations indicate that such alkyl group most likely will contain about 1 to 28 carbon atoms. Thus, the preferred alkanols are those which are branch or straight chain, have 2 to 30 carbon atoms and have a methylene group adjacent the hydroxlated carbon atom. Most preferred of the alkanols are those wherein R' is hydrogen. Illustrative of the above alkanols are 1-butanol; isopropyl alcohol; 1-octanol; 1-hexadecanol:, 1-octadecanol; 1-eicosanol; 1-dodecanol; 1-hexacosanol; 4-methyl-pentanol-2; octanol-2; 1-tetracosanol; 1-pentanol; 1-tetradecanol; 3,3-dimethyl-1-butanol; 4-methyl-1-pentanol; 4-methyl-1-heptanol; 3-methyl-1-heptanol; 3,3-dimethyl-1-heptanol; 3,3-dimethyl-1-hexanol; 4,4-dimethyl-1-heptanol; 4,4-dimethyl-1-hexanol; 3,4-dimethyl-1-heptanol; 3,4-dimethyl-1-hexanol; and the like.

The alcohols may be reacted in their pure form or as mixtures. In particular, alcohol mixtures such as those generally referred to as "Oxo" alcohols having methylene groups adjacent the hydroxylated carbon atoms are suitable as are mixtures of linear alkanols.

The condensation of the above-described alkanols to produce the higher molecular weight β-branched alcohols is effected at elevated temperatures in the presence of an alkali catalyst and a copper salt of a β-diketone.

The alkali metal catalysts are well-known and fully described in the literature relative to Guerbet condensations of alcohols. These alkali catalysts include the alkali metals, alkali metal hydroxides, alkali metal oxides and alkali metal alcoholates. The metals, hydroxides and oxides will, or course, form the alcoholates in the reaction system wherein the hydrocarbon moieties of the alcoholate correspond to the hydrocarbon moieties of the alcohol reactants. When preformed alkali metal alcoholates are used it is not necessary that they correspond with the alcohol reactants. Illustrative of suitable alkali catalysts are metallic sodium or potassium, lithium hydroxide, sodium hydroxide, potassium hydroxide, sodium oxide, potassium oxide, sodium alcoholates, potassium alcoholates, and the like. Obviously other alkali metal compounds may be used provided that they will form the corresponding alcoholates under reaction conditions. Such compounds include the alkali metal bisulfites.

The amount of alkali catalyst employed forms no part of this invention and the effects of various quantities of such catalyst are known in the art. Since large quantities of alkali catalyst lead to increased amounts of unwanted by-products and since good reaction rates are achieved by the improvement of this invention with low levels of alkali catalyst, it is normally not desirable nor is it necessary to exceed an amount of alkali catalyst equivalent to about 4 mols of the alkali metal per 100 mols of alcohol reactants. Generally, an amount of alkali catalyst equivalent to about 0.1 to 4 mols of the alkali metal per 100 mols of alcohol reactants may be employd with satisfactory results, with preferred amounts being equivalent to about 0.5 to 4 mols of the alkali metal on the same basis.

The copper salts useful in the process of this invention are defined by the formula

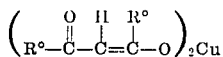

wherein each r°, independently, is a hydrocarbon group having 1 to 10 carbon atoms. Illustrative of these salts are copper salts of β-diketones such as 2,4-pentanedione (commonly referred to as copper acetylacetonate); 2,4-heptanedione; 3,5-heptanedione; 2,6-dimethyl-3,5-heptanedione; 2,4-nonanedione; 3,5-nonanedione; 4,6-nonanedione; 5,7-undecanedione; 2,2,6,6-tetramethyl-3,5-heptanedione; 1,3-diphenyl-1,3-propanedione; and the like The above copper (II) salts may be introduced to the reaction system as such or, in the event they are soluble in inert organic solvents, they may be introduced as solutions. They may also be introduced in solution with the alkanol reactants.

In general, catalytic amounts of the copper (II) salts may be employed. Usually, this will be an amount sufficient to provide at least 1 ppm copper metal based on the alkanol reactants. On the upper side, the limiting considerations are economics and the fact that increased amounts of copper generally result in increased by-products. This increase in by-products may be offset by the fact that the distribution of such by-products also increases the favor of the high-boiling materials and, therefore, greater ease in separating the desired products when employing mixed alkanol reactants. For these reasons one probably will not employ amounts in excess of that which will provide 500 ppm copper metal based on the alkanol reactants. However, as indicated above, increased amounts of the copper salts do reduce the percentage of diene in the by-products formed during reaction. Preferred amounts are those which will provide in the range of about 1 to 100 ppm copper metal, with 5 to 50 ppm being most preferred.

The reaction can generally be carried out over a wide range of temperatures similarly as is known in connection with Guerbet reactions. These temperatures will usually range from 80°C to about 300°C, preferably from about 180°C to about 300°C. The particular temperature employed will depend upon the particular alkanol reactants, the particular alkaline condensing agent employed and other operating considerations well understood in the art.

It is essential that water initially present and that produced from the condensation reaction be removed as the reaction progresses, otherwise the oxidation of the alcohols to carboxylic acids will be increased with a corresponding loss in alkali catalyst through subsequent neutralization of the acids. As indicated in the prior art, water removal from the Guerbet reaction may be effected by employing a dehydrating agent such as calcium oxide or magnesium oxide. However, it is preferred to remove water by azeotropic distillation. The latter procedure is particularly advantageous in the condensation of low molecular weight alcohol while operating under atmospheric and super-atmospheric pressure.

In the process of the invention, it is generally desirable to employ alkali catalysts which contain a minimum of water since any water introduced with the catalyst must be removed as pointed out above. This is not to say that no water can be so introduced and in some cases it may be very advantageous from a materials handling point of view to add the alkali catalyst in the form of a reasonably concentrated aqueous solution.

Except as the above considerations may influence the conduct of the reaction, pressure is not an essential aspect of the process. However, it is desirable to maintain the reactants in a liquid state and thus sufficient pressure will be employed where necessary to achieve this physical state.

Inert diluents may be employed in the reaction as desired and, as indicated before, may be used to introduce the copper (II) salts to the reaction mixture. Such diluents include hydocarbons such as paraffins, olefins, benzene, toluene, xylene, etc.

While some catalytic activity may be obtained with the invention irrespective of the sequence of addition of the materials to the reaction system or the temperatures at addition it has been noted that the greatest catalytic activity for a given quantity of reagent is obtained when either the alkali catalyst or the copper salt or both are added to the remaining reaction mixture after such mixture has been heated to temperatures of about 180°C or greater. This observation is based on the results described in the examples appearing hereinafter.

As previously indicated, the reaction product from the condensation reaction will generally contain, in addition to the higher molecular weight saturated alcohols, higher molecular weight aldehydes and higher molecular weight unsaturated alcohols and aldehydes as well as certain minor amounts of other by-products. Because of the presence of the aldehydes and unsaturated alcohols and aldehydes, it is generally desirable to hydrogenate the reaction product before recovering the product alcohols. Standard techniques may be employed. This has the effect of converting the higher molecular weight aldehydes and unsaturated alcohols and aldehydes to the product alcohols and thus increases the overall yield of the desired product.

In recovering the product alcohols from the hydrogenated reaction product, conventional distillation techniques may be employed whereby unreacted lower molecular weight alcohols will first be separated followed by the product alcohols with the higher boiling by-products remaining behind in the distillation bottoms. When employing a single alkanol reactant any dimeric diene present in the reaction product will be converted to the coresponding paraffin upon hydrogenation and may be separated from the product higher alcohols through distillation. However, when a mixture of alcohol reactants are employed some of the dimeric dienes converted to paraffins upon hydrogenation will not be readily separable from the product higher alcohols by simple distillation due to the similarity in boiling points. This emphasizes again one of the previously mentioned advantages of the process when using mixed alkanol reactants wherein the distribution of by-products in the reaction is shifted from the dimeric dienes to the higher boiling by-products. By reducing the amount of dimeric dienes in the reaction product there results a decreased content of the contaminating paraffins in the product mixed alcohols after hydrogenation and recovery by distillation.

The invention is further illustrated by the following illustrative examples:

EXAMPLE 1

Comparative experiments were conducted to demonstrate the effectiveness of the process of the invention in significantly reducing reaction time while retaining relatively mild reaction conditions for the Guerbet reaction and in altering the distribution of by-products while substantially maintaining the selectivity of the process in producing higher alcohols and the higher saturated aldehyes, unsaturated aldehydes and unsaturated alcohols convertible to the higher alcohols upon simple hydrogenation.

The control experiment was conducted by charging 250 g (1.58 mol) of 1-deconal and 2.1 g (0.0318 mol) KOH pellets (85% KOH, 15% water) to a 500 ml three-necked flask equipped with a Dean-Stark azeotrope trap and reflux condenser, thermometer and stirrer. The reaction mixture was heated to reflux temperatures and maintained at reflux until about 8 ml water was produced and collected. This represented about 50% conversion of the 1-decanol, 1 ml water derived from the KOH pellets and 7 ml water from the condensation reaction. The time required to produce the last 7 ml of water was about 7.25 hours. The crude reaction mixture was acid washed with 25% $H_2SO_4$ followed by water washing to remove the alkali catalyst. After removing the water the entire reaction mixture was analyzed by gas chromatography which indicated about 51% by weight conversion of the 1-decanol. The reaction product anaylzed as about 93% by weight saturated alcohol having 20 carbon atoms and alcohol precursor having 20 carbon atoms (saturated aldehyde and unsaturated aldehyde and alcohol), about 5% by weight dimeric diene having 20 carbon atoms and about 2% by weight higher boiling by-products.

Several experiments demonstrating the invention were carried out in the same manner as described in the above control experiment except that various levels of copper acetylacetonate were employed as a co-catalyst and the sequence of addition of the materials was varied as outlined below:

A. An amount of copper acetylacetonate was employed sufficient to provide about 25 ppm copper metal based on the alkanol reactant and the sequence of addition involved introducing both the copper salt and the KOH pellets to the alkanol at ambient (room) temperatures.

B. The copper acetylacetonate was employed in an amount sufficient to provide about 50 ppm copper metal and the sequence of addition was the same as in (A).

C. The copper acetylacetonate was employed in an amount sufficient to provide about 100 ppm copper metal and the sequence of addition involved adding the KOH pellets to the alkanol at ambient temperatures followed by heating the mixture to about 200°C converting the KOH to potassium alkoxide and then adding the copper salt.

D. The copper acetylacetonate was employed in an amount sufficient to provide about 10 ppm copper metal with the sequence of addition being the same as in (C).

E. The copper acetylacetonate was employed in an amount sufficient to provide about 5 ppm copper metal with the sequence of addition being the same as in (C).

The comparative results are set forth in Table I.

TABLE I

| Cu (ppm) | Reaction Time | Conversion (wt %) | $C_{20}$ Alcohol % Alcohol Precursor (Wt %) | Diene (wt %) | HB (wt %) |
|---|---|---|---|---|---|
| 0 | 7.25 hr | 51 | 93 | 5 | 2 |
| 25 | 80 min | 51 | 94.6 | 1.3 | 4.1 |
| 50 | 41 min | 57 | 92.6 | 1.8 | 5.6 |
| 100 | 27 min | 55 | 91.1 | 0.3 | 8.5 |
| 10 | 35 min | 57 | 92.8 | 0.5 | 6.7 |
| 5 | 54 min | 55 | 94.4 | 0.9 | 4.7 |

EXAMPLE 2

Using the same equipment described in Example 1, 250 g of 1-decanol, 104 mg of copper acetylacetonate (100 ppm copper based on the alkanol) and 3.9 g of 45% aqueous KOH were charged in that sequence to the reaction flask at ambient temperatures, heated to reflux and maintained at reflux until about 7 ml water was produced and collected beyond that which was accounted for due to the water present in the KOH. The time required to produce this last 7 ml of water was about 61 minutes. Analysis of the reaction mixture by gas chromatography indicated about 53% conversion of the 1-decanol with the reaction product analyzing as about 94.4% by weight saturated alcohol having 20 carbon atoms, about 1.0% by weight dimeric diene and about 4.6% by weight high-boiling by-products.

EXAMPLE 3

To demonstrate the effect of increasing amounts of copper salt catalyst with addition of both the alkali catalyst and copper salt to the alkanol reactant the following experiment was carried out and the data tabulated in Table I along with data from Examples 1A and 1B which were performed in the same manner except at different levels of copper salt.

The procedure described in Example 1A was followed except that an amount of copper acetylacetonate was employed equivalent to about 10 ppm copper. The reaction product was not analyzed and the reaction was conducted for only 20 minutes after the water attributed to the KOH had been collected. During this time an estimated 0.3 ml of water was collected indicating a conversion of somewhat less than 5%.

TABLE II

| Example | ppm Cu | Reaction Time | Conversion (Wt %) |
|---|---|---|---|
| 3 | 10 | 20 min | <5 |
| 1A | 25 | 80 min | 51 |
| 1B | 50 | 41 min | 57 |

EXAMPLE 4

Another example of the invention was conducted using the procedure described in Example 1C except that after preforming the potassium alkoxide, and removing the water associated therewith, the reaction mixture was cooled to about 60°C at which time 104 mg of copper acetylacetonate was added (100 ppm copper) and then the reaction mixture was heated to reflux to effect condensation of the alkanol. The reaction was timed until an estimated 7 ml of water were recovered reflecting about 50% conversion. The time required was 51 minutes.

A similar experiment was attempted using the same procedure but only employing 50 ppm copper. After collecting the water attributable to the KOH, the reaction was continued for about 60 minutes during which time only about 0.4 ml water was collected reflecting a conversion of somewhat less than 5%.

EXAMPLE 5

Two further experiments in accordance with the invention were carried out essentially as described in Example 1A except that one employed 100 ppm copper and the other employed 5 ppm copper and sequence of addition in both involved heating the alkanol to about 200°C and then adding the copper salt followed by the KOH. The reaction mixture then was heated to reflux and maintained throughout the condensation reaction.

In each experiment the water attributed to the KOH was collected and then the reaction was timed until an estimated 7 ml of water were collected reflecting about 50% conversion. The time for this to occur was recorded in each instance and appears in Table III.

TABLE III

| Example | ppm Cu | Reaction Time | Conversion (wt %) |
|---|---|---|---|
| 5A | 100 | 26 min | 50 |
| 5B | 5 | 47 min | 50 |

EXAMPLE 6

In another experiment demonstrating the invention the procedure according to Example 1A except that sufficient copper acetylacetone was employed to provide about 5 ppm copper and the sequence of addition involved adding the copper salt to the alkanol at ambient temperature and thereafter heating the mixture to about 200°C followed by addition of the KOH pellets. The entire reaction mixture was then heated to reflux and maintained there until the water attributed to the KOH and an estimated additional 7 ml of water had been collected evidencing about 50% conversion. The time required to produce and collect the 7 ml of water was about 48 minutes.

EXAMPLE 7

Similar results to those in Example 6 may be obtained using 1-nonanol and the copper salt of 2,6-dimethyl-3,5-heptanedione.

EXAMPLE 8

The process of the invention may also be carried out in accordance with Example 6 using 1-tetracosanol or 1-codecanol or mixtures of each using sodium hydroxide and copper acetylacetonate as the catalyst system.

Thus having described the invention in detail, it will be understood by those skilled in the art that certain variations and modifications may be made without departing from the spirit and scope of the invention as described herein and defined in the appended claims.

We claim:

1. A process for producing higher molecular weight hydrocarbon alcohols by condensing at least one lower molecular weight alkanol having a methylene group adjacent the hydroxylated carbon atom; said process being carried out in the liquid phase at temperatures in the range of 80°C to about 300°C in the presence of an alkali catalyst and a copper salt while simultaneously removing water as it forms; said alkali catalyst being an alkali metal, alkali metal oxide, alkali metal hydroxide, alkali metal hydrocarbon alcoholate or alkali metal bisulfite and employed in an amount equivalent to about 0.1 to 4 mols of alkali metal per 100 mols of alkanol reactant; said copper salt being defined by

wherein each R°, independently, is a hydrocarbon group having 1 to 10 carbon atoms an employed in an amount sufficient to provide at least 1 ppm copper metal based on the alkanol reactant.

2. A process according to claim 1 wherein each R°, independently, is an alkyl group.

3. A process according to claim 2 wherein each $R^a$ is an alkyl group of different chain length.

4. A process according to claim 1 wherein the copper salt is copper acetylacetonate.

5. A process according to claim 4 wherein the alkali catalyst is potassium hydroxide, sodium hydroxide, potassium alcoholate, or sodium alcoholate.

6. A process according to claim 1 wherein a mixture of lower molecular weight alkanols is employed.

7. A process according to claim 1 wherein the amount of copper salt is sufficient to provide 1 to 100 ppm copper metal based on the alkanol reactant.

8. A process according to claim 1 wherein the temperatures are in the range of about 180°C to about 300°C.

9. A process according to claim 8 wherein the alkali catalyst is employed in an amount equivalent to about 0.5 to 4 mols of alkali metal per 100 mols of alkanol reactant.

10. A process according to claim 9 wherein the copper salt is employed in an amount sufficient to provide about 5 to 50 ppm copper metal based on the alkanol reactant.

* * * * *